Patented Feb. 13, 1934

1,947,115

UNITED STATES PATENT OFFICE 1,947,115

TREATMENT OF INSECT-INFESTED FRUIT IN PREPARATION FOR MARKET

Bronson Cushing Skinner, Dunedin, Fla., assignor to Brogdex Company, Los Angeles, Calif., a corporation of Florida No Drawing. Application December 24, 1929
Serial No. 416,301

6 Claims. (Cl. 99—8)

This invention relates to treatment of insect-infested fruit in preparation for market; and it is more particularly concerned with methods of processing oranges, grapefruit, or other fresh fruit, grown in localities actually or supposedly infested with the Mediterranean fly, for example, and therefore deemed likely to carry the fly eggs and larvæ or maggots to a greater or less extent, the treatment comprising essentially subjecting the suspected fruit to a prolonged heat treatment in an atmosphere which may be either dry or moist, but which in the best embodiment of the invention is very humid and most desirably substantially saturated with moisture, and also including as an accompanying protective measure, either preceding or following the prolonged heating, the further step of providing the fruit with a partially permeable film-like coating of suitable sealing material; whereby such eggs and larvæ as may be carried by the fruit are rendered permanently inactive and incapable of further development, thus making it practicable to ship the fruit to market without danger of spreading the infestation to other localities, while at the same time the wilt and shrinkage which would otherwise result from the heat treatment is prevented or greatly reduced.

The recently discovered Mediterranean fly infestation in Florida has brought about a situation extremely serious for growers and shippers of citrus fruits especially. This situation has necessitated taking all precautions to prevent spread of the infestation to other localities through shipments carrying eggs and/or larvæ which might eventually develop and produce the fly. As a consequence, shipments from sections which are infested or suspected of being infested are either wholly banned or else restricted to cases where it can be established to the satisfaction of the authorities that the particular lots of fruit in question are free of active infestation and that it can therefore be shipped without danger of spreading infestation.

In accordance with the present invention, fruit suspected of being infested is rendered safe to ship by prolonged heating, most desirably for several hours, the temperature being maintained as a rule at not substantially less than 100° F., and most desirably at around 110° to 115° F., during the heating period. In practice it is usually advisable also to maintain a fairly high degree of humidity in the chamber in which this heating is effected. Care should be taken to avoid a temperature sufficiently high to burn, scald, or otherwise render the fruit uncommercial. The fruit is also provided with a protective film coating of waxy or other suitable sealing material, either before or after the prolonged heating, as hereinafter described.

In one practical way of carrying out the novel method, the lot of fruit to be processed is placed in a chamber provided with heating means, together with means for keeping the air in the chamber amply moist. For example, there may be a receptacle in the bottom of the chamber containing water, the receptacle being heated electrically or otherwise to vaporize the water at the desired rate and maintain the temperature within the chamber at the desired point, say at 110° to 115° F. Suitable thermostatic means for automatically controlling the temperature may be included in the equipment, or such control may be manually effected. The fruit is held in the chamber at this temperature, in the steam-laden or substantially moisture-saturated atmosphere, for several hours, most desirably from four to six hours. At the end of this time all fly eggs and larvæ, if any were present, have been rendered permanently inactive and harmless, and the fruit can be safely packed and shipped.

Instead of generating steam or water vapor within the chamber as described, steam may be introduced from outside at a rate just sufficient to maintain the temperature within the desired range, the steam condensing on the fruit and thereby warming it.

While the moist heat treatment described is much less severe on the fruit than is dry heat treatment, nevertheless it would inevitably increase the natural rate of wilt or shrinkage in the absence of precautions to offset this. Therefore the heat treatment is followed in this illustrative example by the further step of providing the fruit with a film coating of material adapted to partially (but not wholly) seal the rind pores and thus to greatly reduce the wilt or loss of moisture content which the fruit would otherwise undergo rapidly. It is essential that the coating be partially permeable; that is, it should be permeable by gases to such an extent that transpiration or breathing of the fruit is not unduly suppressed, since otherwise the flavor of the fruit would be impaired through fermentation or other break-down of the fruit. Various sealing substances are available for this purpose, those of oleaginous or waxy nature being most suitable. Paraffin wax, properly applied as a film coating of extreme thinness, affords especially good protection against wilt, holding the fruit plump and relatively unwithered for long marketing periods. Successful methods of providing fresh fruit with a wilt-reducing coating are shown for example, in Patents Nos. 1,641,112 and 1,671,924 to Brogden. While this step is therefore no longer novel, in and of itself, the combination thereof with a prolonged heat treatment of the fruit, whether by dry or moist heat, to eliminate insect infestation is novel and highly important for realizing the benefits of said treatment in maximum degree. Its employment in such combination therefore constitutes an important phase of the present invention in its best practical embodiment.

The beneficial effects of providing the fruit with a wilt-reducing coating can be realized to a still greater extent if the coating be applied prior to the prolonged heating of the fruit, since its surface is thereby largely protected from adverse action by the heated atmospheric environment, moist or dry, which is mainly responsible for the aging and wilting effect on the fruit; while at the same time, the desired insecticidal effect of the heat on such fly eggs and larvæ as may be carried by the fruit is fully attained.

Such washing or cleansing of the fruit as may be necessary to remove dirt, scale, or other foreign matter from its surface should precede application of the wilt-reducing coating. Where the coating step follows the prolonged heat treatment, the washing or cleansing step may either precede or follow said heat treatment.

The term "fruit" as used in the appended claims is to be understood, unless otherwise indicated, in a generic sense to include not only citrus and other fresh fruits commonly so-called, but also such vegetables as are liable to infestation of the character described and are amenable to treatment in the manner herein set forth.

What is claimed is:

1. In the preparation for market of fresh fruit actually or supposedly carrying insect infestation of the character described, the process which comprises providing such fruit with a permeable coating of sealing material adequate to reduce wilt and shrinkage, and then subjecting the fruit to prolonged heating at a temperature insufficiently high to render the fruit uncommercial as fresh fruit.

2. In the preparation for market of fresh fruit actually or supposedly carrying insect infestation of the character described, the process which comprises providing such fruit with a partially permeable coating of sealing material adequate to reduce wilt and shrinkage, and then subjecting the fruit to prolonged heating in a moist atmosphere at a temperature of at least 100° F., but insufficiently high to render the fruit uncommercial as fresh fruit.

3. In the preparation for market of fresh fruit actually or supposedly carrying insect infestation of the character described, the process which comprises providing the fruit with a thin film-like coating comprising waxy material adequate to reduce wilt and shrinkage, and then subjecting the fruit to prolonged heating for several hours in a moist atmosphere maintained at a temperature of at least 100° F., but insufficiently high to render the fruit uncommercial as fresh fruit.

4. In the preparation for market of fresh fruit actually or supposedly carrying insect infestation of the character described, the process which comprises providing such fruit with a partially permeable coating of sealing material adequate to reduce wilt and shrinkage, and then subjecting such fruit to prolonged heating in a moist atmosphere at a temperature sufficiently high to render the infestation permanently inactive but insufficiently high to render the fruit uncommercial as fresh fruit.

5. In the preparation for market of fresh fruit actually or supposedly carrying insect infestation of the character described, the process which comprises providing such fruit with a thin film-like coating of sealing material adequate to reduce wilt and shrinkage, and then steaming such fruit for several hours at a temperature of at least 100° F., but insufficiently high to scald the fruit.

6. In the preparation for market of fresh fruit actually or supposedly carrying insect infestation of the character described, the process which comprises providing such fruit with a thin film-like coating comprising waxy material adequate to reduce wilt and shrinkage, and then steaming the fruit around four to six hours at a temperature approximating 110° to 115° F.

BRONSON CUSHING SKINNER.